(12) United States Patent  
Shochat et al.

(10) Patent No.: US 8,307,246 B2  
(45) Date of Patent: Nov. 6, 2012

(54) REAL TIME MONITORING OF COMPUTER FOR DETERMINING SPEED OF VARIOUS PROCESSES

(75) Inventors: Eden Shochat, Herzliyya (IL); David Elkind, Beit Shemesh (IL)

(73) Assignee: Aternity Information Systems Ltd., Hod Hasharon (IL)

( * ) Notice: Subject to any disclaimer, the term of this patent is extended or adjusted under 35 U.S.C. 154(b) by 0 days.

(21) Appl. No.: 12/608,451

(22) Filed: Oct. 29, 2009

(65) Prior Publication Data

US 2010/0107014 A1 Apr. 29, 2010

Related U.S. Application Data

(60) Provisional application No. 61/109,419, filed on Oct. 29, 2008.

(51) Int. Cl.  
*G06F 11/00* (2006.01)

(52) U.S. Cl. .......................... 714/38.1; 714/25

(58) Field of Classification Search .............. 714/38, 714/38.1, 25; 718/100  
See application file for complete search history.

(56) References Cited

U.S. PATENT DOCUMENTS

| | | | |
|---|---|---|---|
| 5,938,775 A * | 8/1999 | Damani et al. ............... | 714/15 |
| 6,105,148 A * | 8/2000 | Chung et al. ................ | 714/16 |
| 6,282,701 B1 * | 8/2001 | Wygodny et al. ............ | 717/125 |
| 6,842,898 B1 * | 1/2005 | Carlson et al. .............. | 718/100 |
| 7,900,195 B2 * | 3/2011 | Begg et al. .................. | 717/128 |
| 8,171,491 B2 * | 5/2012 | Monnie et al. ............... | 719/310 |
| 2002/0129079 A1 * | 9/2002 | Long et al. .................. | 709/100 |
| 2004/0031034 A1 * | 2/2004 | Lewis .......................... | 718/102 |
| 2004/0249935 A1 * | 12/2004 | Jackson et al. .............. | 709/224 |
| 2005/0028145 A1 * | 2/2005 | Kang et al. .................. | 717/128 |
| 2005/0193278 A1 * | 9/2005 | Hammarlund et al. ....... | 714/47 |
| 2005/0235136 A1 * | 10/2005 | Barsotti et al. .............. | 713/1 |
| 2005/0262181 A1 * | 11/2005 | Schmidt et al. ............. | 709/200 |
| 2006/0064687 A1 * | 3/2006 | Dostert ........................ | 718/1 |
| 2006/0072479 A1 * | 4/2006 | Loyd ............................ | 370/254 |
| 2006/0136915 A1 * | 6/2006 | Aingaran et al. ............ | 718/100 |
| 2006/0212417 A1 * | 9/2006 | Barsness et al. ............. | 707/1 |
| 2007/0220515 A1 * | 9/2007 | Dewitt et al. ............... | 718/100 |
| 2008/0229308 A1 * | 9/2008 | Wyman ....................... | 718/100 |
| 2008/0263280 A1 * | 10/2008 | Gara et al. ................... | 711/121 |
| 2009/0106278 A1 * | 4/2009 | Ramacher et al. ........... | 707/100 |
| 2009/0126019 A1 * | 5/2009 | Memon et al. ............... | 726/23 |
| 2009/0132061 A1 * | 5/2009 | Stubbs et al. ................ | 700/8 |
| 2009/0132796 A1 * | 5/2009 | Snyder et al. ................ | 712/229 |
| 2009/0133019 A1 * | 5/2009 | Dumas et al. ............... | 718/100 |
| 2009/0138670 A1 * | 5/2009 | Mutlu et al. ................. | 711/167 |
| 2009/0165007 A1 * | 6/2009 | Aghajanyan ................ | 718/103 |
| 2009/0235262 A1 * | 9/2009 | Ceze et al. .................. | 718/102 |

* cited by examiner

*Primary Examiner* — Scott Baderman  
*Assistant Examiner* — Loan L. T. Truong  
(74) *Attorney, Agent, or Firm* — The Law Office of Michael E. Kondoudis

(57) ABSTRACT

A system is disclosed for identifying one or more causes of a computer executing one or more processes running slowly, the system includes: apparatus for detecting states of one or more threads of the one or more processes; apparatus for identifying one or more of said one or more processes that have one or more threads with wait states that occur above a threshold to indicate which modules within a process or processes is causing said computer to run slowly. In one embodiment the system as the apparatus for detecting states periodically polls the one or more threads of the processes. The system can also include a data structure to store the states of each of said one or more threads each time said thread is polled. The system can be one in which one or more threads are UI threads.

16 Claims, 2 Drawing Sheets

REAL TIME MONITORING OF COMPUTER FOR DETERMINING SPEED OF VARIOUS PROCESSES

CROSS-REFERENCE TO RELATED APPLICATIONS

This Application claims the benefit of U.S. Provisional Application 61/109,419 filed on Oct. 29, 2008, the entirety of which is incorporated herein by reference thereto.

FIELD OF THE INVENTION

This invention relates to determining the cause of the slowdown of a computer and particularly to the cause of the slowdown of a computer while the computer is running.

BACKGROUND OF THE INVENTION

One of the primary problems of the PC (computer) world today in general and Microsoft specifically is that component and multi-tasking Operating Systems such as Microsoft Windows, out of the box, operates relatively fast. But after a few months, as additional applications and extension modules (e.g. ActiveX, OLE Controls, Plug-ins, Filters, etc.) are installed to run on the computer the computer slows down. Other problems include intermittent slow down of PCs resulting from environmental or other conditions that cause a slow down. A PC slowing down is usually considered slowing to a point that a user can perceive the time the PC takes to perform the process or program being monitored. Existing prior art profiler systems are geared for application developers that are looking to profile their applications during the development process. Profiling is the investigation of a program's behavior using information gathered as the program executes. The usual goal of this analysis is to determine which sections of a program to optimize—usually either to increase its speed or decrease its memory requirement (or both). Source and object-code based profilers used by application developers slow the applications down significantly and thus are not appropriate for running within performance sensitive operating environments, such as the ones in use by every day users. There is no system today that can be used while users are actually using the operating system and applications to determine what the cause of the slow down is. The system of this invention can be used to solve this problem.

SUMMARY OF THE INVENTION

The system of this invention includes a method, apparatus and computer readable medium in which a PC operating system is monitored to determine whether certain programs and/or processes (hereinafter processes) in a computer are causing the computer to slow down. This system can monitor a computer for non perceptual delays but it shall be described using an example which discusses time frames that are perceptible.

The system is for identifying one or more causes of a computer executing one or more processes running slowly, the system includes: apparatus for detecting states of one or more threads of the one or more processes; apparatus for identifying one or more of said one or more processes that have one or more threads with wait states that occur above a threshold to indicate which modules within a process or processes is causing said computer to run slowly.

In one embodiment the system as the apparatus for detecting states periodically polls the one or more threads of the processes. The system can also includes a data structure to store the states of each of said one or more threads each time said thread is polled. The system can be one in which one or more threads are UI threads.

In still another embodiment the system the apparatus for detecting states includes apparatus for hooking voluntary API calls.

The system as defined in claim 3 in which said state information is normalized with respect to time.

DETAILED DESCRIPTION OF THE INVENTION

Figure 1:
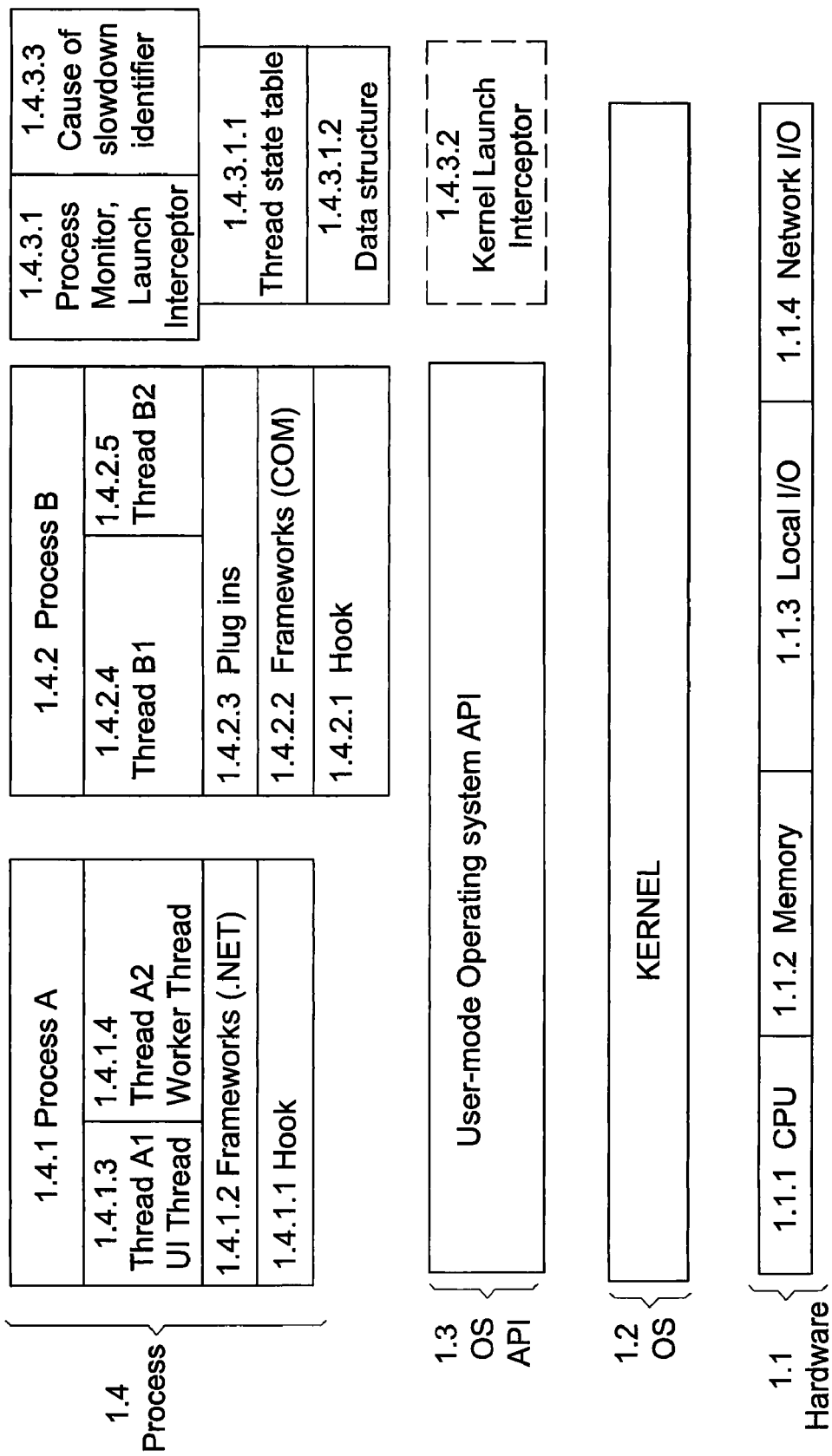
FIG. 1 is a block diagram depicting a PC running on the Windows operating system.

A PC running on a Windows type operating system is comprised from multiple logical layers, see FIG. 1, each taking advantage of the lower layers. The lowest level is the hardware layer (1.1) which provides finite resources that the PC takes advantage of to operate applications. An operating system kernel (1.2) abstracts the hardware layer from the rest of the operating system by providing services to the user-mode operating system API layer (1.3).

In a system of this invention Process Monitor and Launch Interceptor software 1.4.3.1 can be introduced to intercept process launch events as well as collect and aggregate measured process performance information. The Process Monitor Launch Interceptor software 1.4.3.1 is preferably implemented as a system service that starts up as part of the operating system startup process. Optionally, Process Monitor software 1.4.3.1 communicates with an alternate Launch Interceptor software 1.4.3.2 residing on the operating system kernel level 1.2 as a kernel driver.

In operation, the software 1.4.3.1 intercepts one or more predetermined process launch events by using any process launch interception method, which include the following:

1. An operating system API 1.3 causes code 1.4.1.1 and 1.4.2.1 to be loaded upon a process launch by adding the code module into the Windows registry hive within the following key: HKEY_LOCAL_MACHINE\SOFTWARE\Microsoft\Windows NT\CurrentVersion\Windows\AppInit_DLLs; or
2. A kernel-level launch interceptor 1.4.3.2 that utilizes routines known as "Process Structure Routines" exported by NTOSKRNL. One of these APIs PsSetCreateProcessNotifyRoutine( )offers the ability to register system-wide callback function which is called by OS each time when a new process starts, exits or is terminated. The role of the driver is to detect process execution and notify software 1.4.3.1 the control program about these events.

Once a process launch is intercepted, software 1.4.3.1 monitors the threads of one or more processes of interest, such as 1.4.1 and 1.4.2 in FIG. 1. There are many ways to identify the processes of interest, such as, loading a predefined configuration file listing the process launch events of interest and/or processes of interest or have the list entered by a user. To monitor the list, code (1.4.1.1, 1.4.2.1) can be introduced which is capable of performing lookup between a program instruction pointer and an executed module. A running process is comprised from multiple modules, such as frameworks 1.4.1.2 and 1.4.2.2 or plugins 1.4.2.3 in FIG. 2. In a preferred embodiment code is injected for using the loaded modules themselves to perform the lookup. This minimizes the amount of memory required to perform this translation. Another, less preferred way to do this is to load the code into a different process that in addition to the code also loads the modules of the monitored process.

In operation an event or a timer interrupt is used to poll the processes being monitored. Usually the interrupt is activated periodically. The period may be, for example, 10 msec. Any other time interval may be used and can be set dynamically by the system as a result of analysis of previously occurring call stacks, application events (e.g. screen refresh, IO consumed) or environmental variables (e.g. % of CPU consumed) or any other criteria. By polling the state of processes that are unresponsive to the user, the identity of the modules causing the application or PC performance issues can be identified.

Each of the processes has one or more threads, like 1.4.1.3, 1.4.1.4 and 1.4.2.4, 1.4.2.5 in FIG. 1. Each of the threads of the process is looked at. The identity of the most current instruction pointer is determined and the call stack leading to that instruction pointer is also determined.

A multi-process operating system such as Windows switches the processor back and forth between all the program threads that are executing. When a thread is blocked, usually due to an I/O operation or another programmatic reason, the Windows Scheduler finds another thread that is ready to run and schedules it for execution. When the other thread completes, the blocked thread becomes eligible to run again. Threads alternate back and forth between the two states: a ready/running state, where a thread is executing instructions and thus is using the CPU, and a blocked state. The thread state can be one of the following states: Initializing, Ready, Running, Standby, Terminated, Waiting, Transition, Unknown. A thread is in a "Waiting" state either voluntarily, by executing an API command that causes the wait, or involuntary by the operating system determining that it needs to perform an operation in order for the thread to continue execution. In both cases, the reason for the wait is of interest if one needs to understand what is slowing down the application. Each monitored thread has a thread state preserved in the internal data structures of the operating system kernel, e.g., the Windows Kernel. Example wait states would be waiting for a disk drive I/O operation, a network I/O operation or another type of wait object.

An alternate way of using the operating system thread wait state functions is through using "API hooks". In computer programming, the term hooking covers a range of techniques used to alter or augment the behavior of an operating system, of applications, or of other software components by intercepting function calls or messages or events passed between software components. Code that handles such intercepted function calls, events or messages is called a "hook". Hooking is used for many purposes, including debugging and extending functionality. Examples might include intercepting keyboard or mouse event messages before they reach an application, or intercepting operating system calls in order to monitor behavior or modify the function of an application of other component.

By "hooking" Windows API functions that are used to perform wait operations, e.g., local and network I/O, the system can maintain a thread state table 1.4.3.1.1 for each voluntary state of the thread, including a context specific state such as the file name or the URL that was being fetched by the blocking I/O operating causing the thread to block into a wait state. Involuntary states of threads can be obtained form the Operating System thread state store. This information may also put in the thread state table. Optionally other measurements can be stored, such as per-thread memory allocations and de-allocations performed. Such additional information can be used to pinpoint problem threads, e.g., once that allocate and deallocate large amounts of RAM in a short period, or provide additional information for finding the cause of a slowdown.

It is desired to differentiate between threads of execution that are serving the process user interface, commonly known as "UI threads" from other threads, commonly known as "worker threads" which is a thread that does not interact with the user. When a UI Thread is blocked waiting for I/O, a long term CPU operation or for any other reason, the application seems stalled to the user. When a Worker Thread is blocked, there could be no perceived slowdown by the user. By "hooking" the Operating System User Interface API functions, the system is able to associate threads that use UI functions as UI Threads.

It is noted that this thread state table is preferred to using the Operating System thread state as it is typically more accurate and up to date. This state table is accessible upon polling the process threads.

Figure 2:
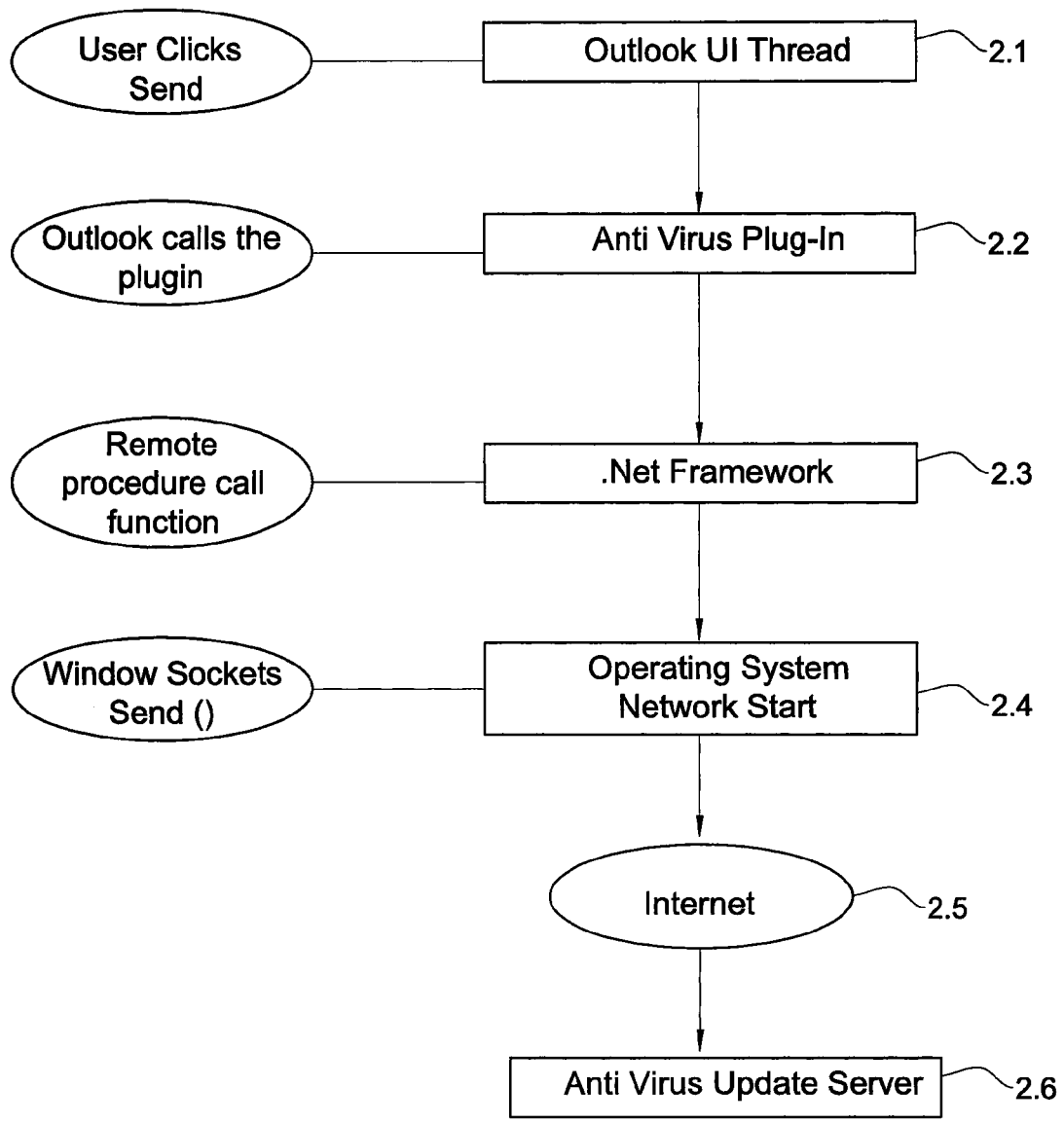
FIG. 2 is a flow diagram depicting a call stack of a specific thread of a process that has slowed down.

In operation, Process Monitor 1.4.3.1 collects thread performance information into data structure 1.4.3.1.2. thread performance information is derived from polling of thread call stacks. A typical call stack is depicted in FIG. 2. In computer science, a call stack is a stack data structure that stores information about the active subroutines of a computer program. This kind of stack is also known as an execution stack, control stack, function stack, or run-time stack and is maintained on a per-thread basis. A call stack is used for several related purposes, but the main reason for having one is to keep track of the point to which each active subroutine should return control when it finishes executing. The active subroutines are those which have been called but have not yet completed execution by returning. If, for example, a subroutine DrawSquare calls a subroutine DrawLine from four different places, the code of DrawLine must have a way of knowing where to return. This is typically done by code for each call within DrawSquare putting the address of the instruction after the particular call statement (the "return address") onto the call stack. FIG. 2 depicts a Send Mail operation initiated by a user within the commonly used Microsoft Outlook program on a computer where anti virus software is installed. Such anti virus software registers with the email software to receive a notification when an email message is sent; this is used by the anti virus software to scan the message for viruses prior to sending. The Outlook UI thread (2.1) causes a notification to be issued to the anti virus plug-in (2.2). To communicate with the anti virus server, the anti virus uses functions contained the .NET framework (2.3) that in turn call the operating system network stack (2.4) which blocks the executing thread while communicating with anti-virus update server (2.6) over a network such as the Internet (2.5). The resulting call stack of the UI thread is blocking on a Windows kernel network function. By analyzing the call stack of each of the monitored threads of an application, it can be understood what was the root module and procedure that ended up causing a user perceived delay. In the case of FIG. 2, it can be deduced that the UI thread is blocked by a Network I/O operation and the culprit is one of 2.2, 2.3 or 2.4.

Preferably, an in-file symbol table containing a map between code offsets to exported procedures such as the one within "Portable Executable" files or external, such as the one embedded in Microsoft PDB files is used to also convert the instruction pointers in the call stack to the specific module exported procedures. As the system can poll dozens of threads, hundreds of times a second over a potentially prolonged period, collected information can be taxing on the PC memory, the collected information is stored in RAM preferably in a memory efficient way. One embodiment could store the entire call stacks converted by a hash function to a hash value derived from the entirety of the call stack, meaning that repeat occurrences of such call stack reference the same entry in the hash table. Alternatively, since the object of this system is to determine which modules are slowing the operation of the computer down a preferred data structure could include only the data identifying the executing module, and data identifying the exported procedure which are required for further analysis of the application performance. A combination of the hash approach and the data reduction approach could also be used. Other data such as counters specifying the number of occurrences of a particular module or exported procedure can also be stored.

The collected thread type (UI vs. Worker) and wait state is optionally stored within the data structures associated with each of the modules and procedure data. By this, counters can be associated with the additional information specifying not only the overall wait time that a thread has experienced but also include contextual information such as whether that thread is a UI thread and whether it was blocking at the time waiting for the CPU or an I/O operation.

Next the data structure is examined to generate a list of modules and exported functions of those modules and/or the number of times they appear. Each exported function or module that appears a number of times can be considered to be one that slows the computer or application down. In FIG. 2 where a network I/O operation is causing the email client to stall, each of the call stack entries 2.1, 2.2, 2.3 and 2.4 could be the initiator of the chain of events causing the I/O operation, As call stacks do not contain information that can be directly used to deduce which of the modules and exported functions stack entries is the cause of the delay, heuristics can be used to associate the counts indicating the delay with the initiating module. In FIG. 2., the Anti-Virus Plugin 2.2 caused the long network I/O delay, and heuristics described below are used to determine that it should be flagged as the likely cause of the delay and thus the counts be associated with it.

There are multiple possible methods for associating the counters with a specific module or exported procedure:

Accumulative: Increase the respective counters of the module and exported function entries in the data structure that are associated with each of the module entries in the collected call stack. In FIG. 2, this would be 2.1, 2.2, 2.3 and 2.4. Accumulative association is simple to implement and doesn't hide any of the modules but can skew results as modules that commonly appear as initiators in the call stack like the Windows User Interface DLLs will have the highest counts even though they are not the modules that caused the thread wait.

Top-Down: Increase the respective counters in the data structure for the first module and exported function of the last non-OS and/or Application vendor and/or Framework vendor in the call stack. In FIG. 2, this would be Anti-Virus plugin 2.2 after evaluating the version information headers of 2.1 and iterating over it as it's developed by the Application vendor. Iterating over modules written by the operating system, application and framework vendors increases the chances for the discovery of the initiating module.

Bottom-Up: Increase the respective counters in the data structure for the first module and exported function of the first non-OS and/or Application vendor and/or Framework in the call stack. In FIG. 2, this would be Anti-Virus plugin 2.2 after evaluating the version information headers of 2.4 and iterating over it as it's written by the OS vendor and iterating over 2.3 as it's a framework. Iterating over modules written by the operating system, application and framework vendors increases the chances for the discovery of the initiating module.

In all methods, a knowledge base can be used to generate coefficients to be used to provide different weighting depending on the likelihood of the specific module or procedure call to be the cause of performance problems. Modules that are developed by an application vendor are less likely to have an impact on the application performance than plug-ins developed for that application by $3^{rd}$ parties and hence could be provided lesser weighting. Modules developed by the operating system vendor can also be given less weighting as these are less likely to be changed over time.

Reports can be generated from the data acquired. These may include a listing of program modules and their corresponding number of times appearing or their time in use. A report could be generated that lists only the modules and/or exported procedures that consume a majority of the execution time. Modules and/or exported procedures could be split in a report between application vendors and the components created by companies or entities other than that application. In a preferred embodiment a weighted graph of the execution time in each of the modules and/or exported functions is generated. The system can provide a table of expected execution times of the various modules and/or exported procedures of commonly used applications.

Optionally additional information including information more helpful to a user can be included in a report. Information to be used in a report can be found in a number of places including the problem module version header. The directory where the module is stored can be included as well as application-specific contextual information (e.g.: Outlook plug-in name).

The system can also be used to measure the time of operation of a module or exported procedure in an application prior to an upgrade/installation of an extension and after such instillation.

To further isolate the problem causing a slow down of a computer, activities (as defined in U.S. patent applications Ser. Nos. 11/316,452 and 11/588,537) can be monitored and occurrences of monitored modules and/or exported procedures can be segregated in accordance with the activity it is involved with at that time to see if the slowing of the module and/or exported procedure is tied only to one or more specific activities.

Optionally, as the collected counters are dependent on the duration of capture, with longer durations generating higher counts, performing further analysis of multiple system sessions would require normalizing the measurements with respect to time to a form that isn't dependent on the capture time frame.

The normalized data should be in a form that allows comparison:
Between multiple capture sessions on the same machine
Between captures performed on different machines or against a knowledge base Normalization takes into account the fact there can be multiple worker threads that utilize the CPU and that there can be multiple cores and processors that the application is running against, performing the application concurrently. To enable that, there are two sets of normalized measurements:

Local: What's the processing duration that a specific PC spends within a specific module. This metric could be different than another PC depending on the respective number of CPUs and cores per CPU. This information is relevant when wanting to understand the performance on the specific PC. For such normalization counters that are collected concurrently are weighted according to the number of executing cores.

Global: What are the processing resource requirements that are independent on the amount of CPUs and cores per CPU available on the specific PC. This form of normalization is required when comparing multiple capture sessions between different PCs. For such normalization counters that are collected are summed up regardless of executing cores.

The system optionally stores collected historical information, optionally normalized for future retrieval and further analysis.

Specific reports can be generated from the information collected above. For example, modules exhibiting high sample counts within UI threads and thus can be considered as having an impact on responsiveness to the user are then evaluated for high sample counts with for the other thread wait state associated measurements of CPU, Local I/O, and Network I/O. The output of the previous method step is preferably a tabular representation that is comprised from the list of modules as rows, sorted according to their impact on the UI responsiveness and with an additional column per each of the thread wait states. Optionally, the rows are comprised from a grouping of such modules, for example the company that wrote the module, the product this module is part of or the directory where this module resides. The tabular output classifies each module as:

CPU Intensive: Most of the module wait state was spent when the CPU was processing CPU instructions. The module is performing CPU intensive operations Local I/O Intensive: Most of the module wait state was spent waiting for local file disk access. Optionally and additionally, this is accompanied with the filenames of the accessed files.

Network I/O: Most of the module wait state was spent waiting for network access, probably using blocked network IO, translating into application hangs upon high latency or server unavailability. Optionally and additionally, this is accompanied with the URLs of the accessed resources in the case of HTTP, NetBIOS name for SMB access or IP in the case of TCP-based host.

If the UI is slow but not attributed to CPU, Local I/O or Network I/O then it's related to other wait-state objects. In such case, additional information such as the type of wait object/state can be provided to allow for further analysis.

Certain modes of grouping and identification of application modules require the inclusion of prior knowledge. For instance, it is impossible to determine the identity of specific operating system component category or the function provided by a specific anti-virus module based only on the information available in module name, version information and other sources that exist on the endpoint. Thus, a Knowledge Base (KB) could provide a central accumulation of such knowledge. The KB would include all of some of the following information:

Additional grouping information for application modules that don't have embedded or inferred differentiated information, e.g., version header, directory information. An example of such module is the Microsoft MSRPC module that is considered to be part of Microsoft Windows Operating System but is known to be specifically related to communication with the server.

Normalized historical, cross-system module baseline sample information will also be included in the knowledge base.

Ideally, such KB would be implemented as a network service shared between multiple implementations of the present invention. The central maintenance of this KB will both ensure validity of stored data and sharing of the additional module information by a multiple analysis engines.

It is well known by IT operations personnel that over-time changes made to the computer hardware or software are a primary cause for performance and availability problems of computer systems. An additional aspect of the present invention is when profiling a specific application, normalized historical data of module utilization is compared to past historical data. If historical data for multiple applications is available, comparison of more than one of these to their historical performance can be used to ascertain whether the change is confined to a specific application or spans multiple, in which case it's likely to be an overall computer problem.

Normalized measurements that are independent of capture period can be used as the basis for cross capture session and inter-end point comparison. Module utilization, according to the different thread wait state types can be compared. In a preferred embodiment, the specific end point that is having performance issues would be placed within a histogram with the Y axis representing normalized sample count and the X axis including different end points, to show how does the specific end point compare to its peers. Such comparison would show the modules most deviating for the specific end point, taking into consideration the inter-end point variance in order not to show "normal" data that would obscure the abnormal one.

The KB above can be used to compare against "best practice" or "well known" KB module utilization data, especially in cases where there isn't enough organizational data. Organizational data can be optionally contributed back to the central knowledge base in order to improve the analysis for the overall system users. Additionally, information generated by the present system can be sent to another system for further processing.

What is claimed is:

1. A system comprising at least one processor operatively associated with a computer memory, the processor being configured to identify one or more causes for a slowdown of a computer executing one or more processes, each of said one or more processes comprising one or more threads, the processor being operable to:
   detect states of said one or more threads, and identify at least one thread in a wait state;
   collect thread performance information of said at least one thread in a wait state, said performance information including data indicative of a performance of different functions of said process;
   identify based on said performance information, one or more functions which are the cause for said slowdown;
   associate between said identified functions and their respective modules; and identify, based on at least, said performance information of said one or more functions and on data related to their associated respective modules, one or more modules from among said modules, which are the cause for said slowdown in said computer.

2. The system of claim 1, wherein said processor is configured to periodically poll said one or more threads of the one or more processes, in order to detect said states.

3. The system of claim 1, also including: a data structure configured to store said thread performance information.

4. The system of claim 1, wherein said one or more threads are UI threads.

5. The system of claim 1 wherein said processor is configured to utilize hooking of voluntary API calls in order to collect said performance information.

6. The system of claim 5, wherein said one or more threads are UI threads.

7. The system of claim 1, wherein said processor is further operable to utilize a knowledge base to store information for translating said performance information into data indicative of one or more functions and respective modules which are the cause for said slowdown.

8. The system of claim 7, wherein said information stored in said knowledge base includes one or more of: historical, cross-system module baseline information.

9. The system of claim 1, wherein said processor is configured to utilize an Operating System maintained thread state store in order to detect states of said one or more threads.

10. The system of claim 1, wherein said performance information is normalized with respect to time.

11. The system of claim 1 wherein said processor is configured to intercept a respective process launch event of said one or more processes, thereby enable to detect states of said one or more threads.

12. The system of claim 1 wherein said processor is configured to poll call stacks of said at least one thread in wait state, in order to collect said performance information.

13. The system of claim 1 wherein said processor is configured to utilize heuristics in order to identify, based on said performance information, one or more functions and their respective modules from among said modules, which are the cause for said slowdown in said computer.

14. The system of claim 1, wherein said processor is configured to utilize a data storage containing data mapping between functions and respective modules in order to associate between said functions and their respective modules.

15. A method for identifying one or more causes for a slowdown of a computer executing one or more processes, each of said one or more processes comprising one or more threads, the method comprising:
   detecting states of said one or more threads, and identifying at least one thread in a wait state;
   collecting thread performance information of said at least one thread in wait state, said performance information includes data being indicative of a performance of different functions of said process;
   identifying based on at least said performance information, one or more functions which are the cause for said slowdown;
   associating between said identified functions and their respective modules; and
   identifying, based on at least said performance information of said one or more functions and on data related to their associated related modules, one or more modules from among said modules, which are the cause for said slowdown in said computer.

16. A none-transitory program storage device readable by machine, tangibly embodying a program of instructions executable by the machine to perform method steps for identifying one or more causes for a slowdown of a computer executing one or more processes, each of said one or more processes comprising one or more threads, the method comprising:
   detecting states of said one or more threads, and identifying at least one thread in a wait state;
   collecting thread performance information of said at least one thread in wait state, said performance information includes data being indicative of a performance of different modulesfunctions of said process;, which are associated with said at least one thread in a wait state; and
   identifying based on at least said performance information, one or more functions which are the cause for said slowdown;
   associating between said identified functions and their respective modules; and
   identifying, based on at least said performance information of said one or more functions and on data related to their associated related modules, one or more modules from among said modules, which are the cause for said slowdown in said computer.

* * * * *